Feb. 28, 1967     W. B. BUEHRLE     3,307,158
MULTI-APERTURE CORE GATE CIRCUITS
Filed Aug. 1, 1963
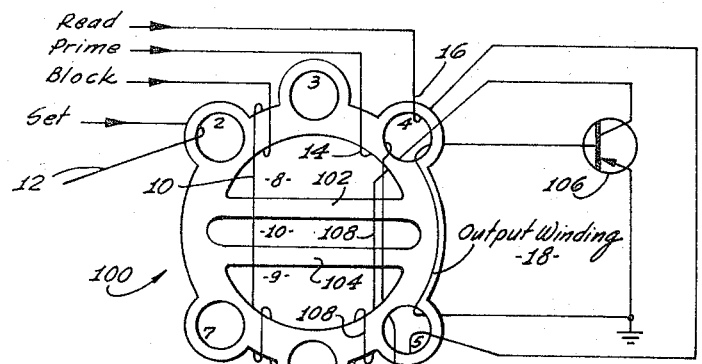
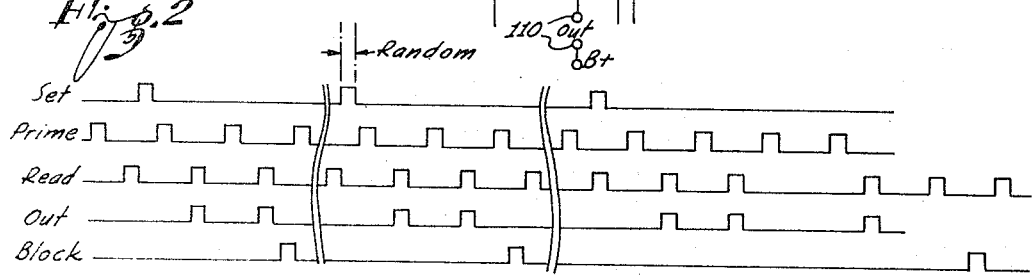
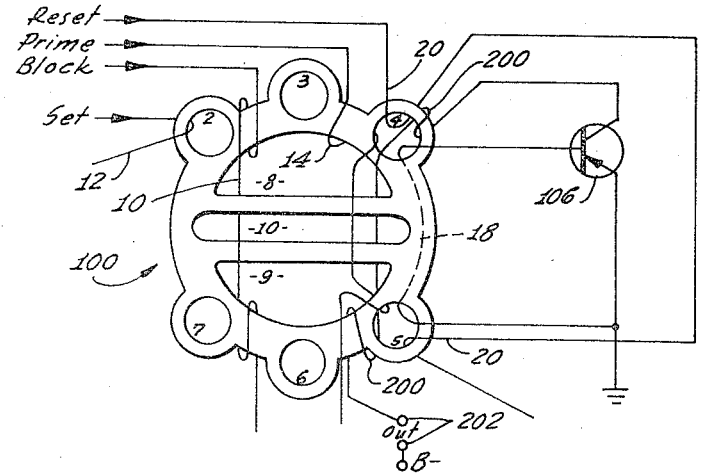
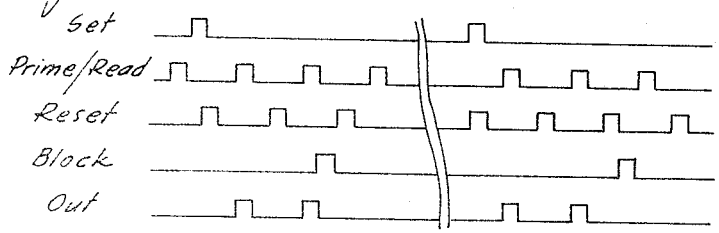
INVENTORS:
William B. Buehrle
Mueller & Aichele
Attorney

United States Patent Office 3,307,158
Patented Feb. 28, 1967

3,307,158
MULTI-APERTURE CORE GATE CIRCUITS
William B. Buehrle, Scottsdale, Ariz., assignor to Motorola, Inc., Franklin Park, Ill., a corporation of Illinois
Filed Aug. 1, 1963, Ser. No. 299,233
5 Claims. (Cl. 340—174)

The present invention relates to gate circuitry utilizing multi-apertured magnetic cores, and it relates more particularly to a combination of such a core and associated transistorized circuitry to constitute an improved gate circuit capable of implementing logic equations.

Multi-apertured magnetic core units are disclosed, for example, in copending application Serial No. 109,440 which was filed May 11, 1961, in the name of Lawrence R. Smith, now Patent 3,217,300. The cores described in the copending application are composed of magnetic material, such as ferrite, having relatively high retentivity. The multi-apertured magnetic core of the type described in the copending application has a major aperture which defines a closed loop major flux path. The core also includes at least one minor aperture which divides the major flux path into two branches. Additional closed loop minor flux paths are provided by the core around each minor aperture.

The minor aperture is smaller than the major aperture, in accordance with present-day terminology, so that the minor flux path about a minor aperture is much shorter than the major flux path about a major aperture. Appropriate windings are provided on the core including, for example, an input winding and an output winding. The minor aperture serves to isolate these windings from one another.

The usefulness of the above mentioned multi-apertured magnetic core structures for logic applications has been recognized for some time. However, the prior art magnetic structure of this general type has certain inherent limitations, and these limitations have retarded the general acceptance of the prior art multi-apertured magnetic core structures in the field of logic circuitry, and in the related fields.

One of the more serious problems in the use of the prior art multi-aperture magnetic core structure arises from the fact that the proper functioning of the prior art structure is dependent upon the so-called threshold characteristics of the magnetic material forming the core. It has proven to be a difficult and costly task to provide suitable magnetic material having the proper threshold characteristics, and one which can be fabricated inexpensively into the prior art type of multi-apertured core structures. It has proven to be especially difficult to provide suitable magnetic material for the prior art magnetic core which is capable of exhibiting desired characteristics for product reliability and product uniformity.

Many of the problems inherent in the prior art multi-apertured magnetic core structures are solved by the use of the cores described in the copending application referred to above. These latter core structures are advantageous in that the magnetic cores constructed in accordance with the teachings of the copending application provide an output signal which is dependent upon the net amount of flux which is switched at two output sections of the structure, so that the structure is characterized by a high signal-to-noise ratio.

The effect of spurious flux switching is minimized in the multi-apertured core structures of the copending application. Therefore, the importance of having magnetic material with clearly defined switching thresholds is not as critical. This means that readily available magnetic materials, of the type which may economically be used in fabricating the multi-apertured core structure, may be used in the construction of magnetic cores fabricated in accordance with the teachings of the copending application. Moreover, this may be achieved without deviating in any manner from the commercially acceptable standards of product uniformity and reliability.

The type of core structure described in the copending application is utilized in the improved gate circuitry of the present invention, so as to enable the circuitry to incorporate transistorized circuits, with the characteristics of the core structures obviating any tendency for the false firing of the transistorized circuits due to spurious flux switching in the core itself.

It is, accordingly, an object of the present invention to provide improved gate circuitry for implementing logic equations, and which may be constructed in a simplified and relatively inexpensive manner.

Another object of the invention is to provide such improved gate circuitry which is extremely reliable in its operation, and which can be constructed with a high degree of product uniformity.

A still further object of the invention is to provide such improved gate circuitry which is eminently simple in its construction.

A feature of the invention is the provision of improved gate circuitry for implementing logic equations, the circuitry incorporating but a single multi-apertured core constructed in accordance with the concepts of the copending application referred to above, and a single transistor.

Other objects, features and advantages of the invention which are believed to be new are set forth with particularity in the claims. The details of the invention, however, may best be understood by reference to the following description, when the description is taken in conjunction with the accompanying drawings, in which:

FIGURE 1 is a schematic representation of a gate circuit constructed in accordance with one embodiment of the invention and including a multi-apertured magnetic core structure and an associated transistor;

FIGURE 2 is a timing diagram useful in explaining the operation of the circuit of FIGURE 1;

FIGURE 3 is a schematic representation of a gate circuit constructed in accordance with a second embodiment of the invention and operating in a manner slightly different from the gate circuit of FIGURE 1; and FIGURE 4 is a timing diagram useful in explaining the operation of the gate circuit of FIGURE 3.

At the outset it should be explained that the magnetic core structures utilized in the gate circuit of FIGURES 1 and 3 are of the type described in the copending application Serial No. 109,440, as explained above. However, the core structure described in the copending application is a true and complement type of magnetic unit. The core described in the copending application includes, for example, a core having a configuration such that two major closed loop flux paths are formed, each of which is adapted to store and transfer binary information independently of the other. In one section the information is transferred in a "true" binary sense, and in the other section the binary information is transferred in a "complement" sense.

Signals representing a binary "1" may be stored by one section of the magnetic structure described in the copending application, and signals representing binary "0" may be stored in the other section. As described in the copending application, the "true" and "complement" magnetic unit is useful in many storage and logic applications. Although similar cores are utilized in the gate circuitry to be described herein, one section only of each core is actually switched and operated upon. The other section is used for noise cancellation purposes, and in this regard increases the signal-to-noise ratios of the units considerably.

Each of the two sections of the multi-apertured core tructure described in the copending application has an output minor aperture which divides the respective major flux path into branches, and each section of the core may also have an input minor aperture if desired. The input and output minor apertures of each section are linked by respective input and output windings, and the magnetic core serves to transfer signals from the input winding to the output winding. The information represented by the input signals is stored in the form of flux in the magnetic material during this transfer process.

As mentioned in the copending application, one of the most significant advantages of the "true" and "complement" magnetic structure is that it is not adversely affected by the so-called "noise flux" in the core which may be switched in the magnetic material. This is achieved by causing the output winding to pass through the two output minor apertures of the two sections of the core, so as to be linked by the minor flux paths about those apertures in an opposed relation. An output representing binary "1" is in the form of current in one direction in the output winding, and this current is produced when more flux is switched about the "1" output aperture than about the "0" output aperture.

An output representing binary "0" information is in the form of current in the opposite direction in the output winding, and it follows that this output is produced when more flux is switched about the "0" minor output aperture than about the "1" minor output aperture. Therefore, the binary operation of the magnetic structure of the copending application does not rely upon flux being switched or not switched, as is the case with devices of the prior art, but rather relies upon the flux differential which is switched at the two output apertures.

The magnetic circuit of FIGURE 1 includes a multi-apertured magnetic core of the type described in the copending case, and the core is designated 100. The core 100 is composed of magnetic material having a generally square or rectangular hysteresis loop, and having relatively high retentivity. This material, preferably, is a ferrite.

The multi-apertured magnetic core of FIGURE 1 has an upper half and a lower half, the two halves of the core being symmetrical. The two halves are rendered distinct sections by an elongated aperture 10 which forms two central legs 102 and 104. The upper half of the core 100 will be referred to herein as the "true" section, and the lower half will be referred to as the "complement" section.

There are two major apertures 8 and 9 in the core 100. The major aperture 8 is in the "true" section of the core, and the major aperture 9 is in the "complement" section. These major apertures define the major flux paths in the core.

The smaller, or minor apertures, which are spaced about the annular portion of the core divide the major flux path in each section of the core into branches, and there is a minor flux path about each of the minor apertures. The aperture 2 is the input aperture of the "true" section of the core 100, and the minor aperture 4 is the output aperture for the "true" section of the core. The minor aperture 7 is the input aperture for the "complement" section of the core 100, and the minor aperture 5 is the output aperture for the "complement" section. Two further minor apertures 3 and 6 may be used as either input or output apertures as desired.

The gate circuit of FIGURE 1 includes a block winding 10 which links the core 100, and which then may extend on to link other similar cores. As shown in FIGURE 1, the block winding 10 extends through the major aperture 8 of the "true" section of the core 100, and through the major aperture 9 of the "complement" section of the core.

The gate circuit of FIGURE 1 also includes a "set" winding 12 which extends through the minor aperture 2, and which may continue on to link other similar cores.

In addition, the gate circuit of FIGURE 1 includes a "prime" winding 14 which links the minor output aperture 4 of the "true" section of the core, and which also links the minor output aperture 5 of the "complement" section of the core. The gate circuit of FIGURE 1 also includes a read winding 16 which links the minor output aperture 4 of the "true" section of the core, and which also links the minor output aperture 5 of the "complement" section. The read winding may, likewise, continue to other similar cores to link the other cores in the same manner.

An output winding 18 links the output minor apertures 4 and 5 in opposite directions. One side of the output winding is connected to the base of a PNP transistor 106, and the other side of the output winding is connected to the grounded emitter of the transistor. The collector of the transistor 106 is connected to a winding 108 which passes through the aperture 4 to provide regenerative action and extends through the major apertures 8 and 9 of the "complement" section for flux steering purposes. The winding 108 is connected to one of a pair of output terminals 110. The other output terminal is connected to the negative terminal B— of a source of unidirectional potential, the positive terminal of which may be grounded.

The clock pulses of the system are applied to the prime winding 14, and these pulses occur, for example, at regular intervals as shown by the "prime" pulse series of FIGURE 2. The core 100 is initially set in a clear or "blocked" condition by a signal applied to the block winding 10, this signal being represented by the lowermost series of pulses in FIGURE 2.

So long as the core 100 is in the blocked condition, the flux is discontinuous about the output minor aperture 4 such that a prime pulse applied to the prime winding 14 does not reverse at the aperture 4, so that there is no output produced by the transistor 106.

However, if a set pulse, as shown by the uppermost series of pulses of FIGURE 2, is applied to the set winding 12, the resulting flux direction in the major and minor paths of the "true" section of the core 100 are such that a signal may be transferred through the device, so as to produce an output.

The first prime pulse after the setting of the core causes the minor flux about the output aperture 4 to be reversed, so that an output is produced in the output winding 18. However, the polarity of the signal produced in the output winding is such that the transistor 106 is not rendered conductive. Now, should a prime pulse be followed by a read pulse, as shown in FIGURE 2, the minor flux about the output aperture 4 is switched in a direction such that the resulting current in the output winding 18 causes the transistor 106 to become conductive. The resulting collector current in the transistor produces the desired output signal across the output terminals 110.

It follows, therefore, that so long as the core 100 is in a blocked condition, neither the prime pulses nor the read pulses are capable of producing a transfer of information through the gate circuit. However, once a set condition has been established in the core, each prime pulse followed by a read pulse is capable of producing a corresponding transfer of information through the gate circuit, and this condition continues until a block pulse is again applied to the block winding 10, so as to return the core 100 to its original block condition. Then, no further transfer of information may be achieved through the gate circuit until a further set pulse is applied to the set winding 12. The gate circuit of FIGURE 1 provides, therefore, a series of output pulses which are synchronized with a corresponding series of read input pulses.

A feature of the gate circuit of FIGURE 1 is the fact that the output pulses can be turned off without interrupting the clocking prime input pulses or the read input pulses, merely by the introduction of a block pulse to the block winding 10 which returns the core to the blocked condition. When the core is in the blocked condition, the prime and read input pulses have no substantial effect on the transistor circuit. The only way in which an output can be achieved is to set and prime the core, and then apply either the block or the read pulses, or both, as described above.

The connection of the collector circuit of the transistor 106 to the winding 108 serves to assure that the flow of base current in the transistor 106 will not set the bottom complement section of the core. It will be remembered that the complement section of the core 100 is used for noise cancellation purposes only, and its flux state should remain in the blocked condition.

The gate circuit of FIGURE 1 can be modified so as to perform a variety of logic functions. In its present form, for example, it can be utilized for different logic functions inasmuch as the core can be set, primed, and then an output can be achieved at read time if so desired.

The collector of the transistor 106 can also be regenerated back into the block winding 10, or into another block winding, to cause the output to be limited to a single pulse, for certain logic applications. With such a connection, the gate circuit can be set, primed, and then either read or blocked, and only one output is achieved. That is because the regeneration of the transistor when the first output is produced will cause the core to block itself.

It should also be pointed out that there is no need for the various inputs to the gate circuit of FIGURE 1 to be synchronized with one another. For the proper operation of the device, it is merely necessary for the prime and read pulses to follow the set pulse with any desired time displacement.

The gate circuit shown in FIGURE 3 is generally similar to the system of FIGURE 1, and like elements have been designated by the same components. Again, we have a core 100 with minor apertures 2, 3 and 4 in the "true" section, and with minor apertures 5, 6 and 7 in the "complement" section. As before, the "true" section has a major aperture 8, and the "complement" section has a major aperture 9.

The block winding 10 links the major apertures of the "true" and "complement" sections as in the previous embodiment. Likewise, the set winding 12 links the minor aperture 2 as previously. The prime winding 14, likewise, links the minor apertures 4 and 5 in the same directions, whereas the output winding 18 links apertures 4 and 5 in an opposed sense.

In the embodiment of FIGURE 3, the collector of the transistor 106 is connected to a winding 200 which extends through the minor aperture 4, and which also extends down through the major aperture 9 of the complement section of the core to the output terminals 202. The gate circuit of FIGURE 3 also includes a reset winding 20 which extends in the same direction through the minor apertures 4 and 5.

In the gate circuit of FIGURE 3, an output is produced after the core is set, and during the application of a prime pulse. That is, unlike the previous embodiment, there is no requirement for a separate read pulse to follow the prime pulse in order to produce an output. However, as before, it is necessary, after the core has been first established to its initial blocked condition, to set the core before an output may be obtained. After the core has been set, output pulses can be obtained at prime time by resetting the core between each prime pulse (FIGURE 4).

In other words, the magnetic core of the embodiment of FIGURE 3 must be set, as in the previous embodiment, before an output can be obtained. If the core is blocked after it has been set, no output is produced. Again, no output can be achieved until the core of the embodiment of FIGURE 3 is primed. However, in the latter embodiment, the output occurs at prime time instead of at read time.

In the latter embodiment, the collector of the transistor 106 is regenerated through the minor aperture 4 in the true section of the core, and the regeneration winding 200 from the transistor collector also passes through the major aperture 8 of the true section to perform a flux steering function. This is to prevent the gate circuit of FIGURE 3 from producing a series of successively narrower pulses after it generates the first output pulses. As in the previous embodiment, the winding 200 continues down through the major aperture 9 of the complement section to hold that section in its blocked condition. When the transistor 106 is conductive, the base current of the transistor (flowing in the output winding 18) has a tendency to cause the complement section of the core 100 to be set. The linking of the collector of the transistor 106 down into the bottom half of the core by means of the winding 200, serves to prevent such undesired setting of the complement section of the core. The latter effect occurs in the device of FIGURE 3, but not that of FIGURE 1 since the sense of the output winding is opposite.

In the embodiment of FIGURE 3, if the magnetic core 100 is set and then blocked, no output may be obtained. Likewise, if the core is set and then reset by the application of a reset pulse (FIGURE 4) to the reset winding, again no output may be obtained. As mentioned above, no output is possible under any circumstances until a prime pulse is applied to the prime winding 14. However, in the latter embodiment, as opposed to the embodiment of FIGURE 1, the output is provided at prime time, rather than at read time.

In the previous embodiment of FIGURE 1, the collector of the transistor may be regenerated to the block winding for a single output, as mentioned above. In the embodiment of FIGURE 3 this is not possible, because of the regeneration of the transistor causes the core to be set. In the embodiment of FIGURE 3 the noise cancellation connection of the windings perform an even more critical function inasmuch as noise has a tendency to cause the core to be set if noise increases enough to cause transistor 106 to fire.

The invention provides, therefore, an improved gate circuit which utilizes a multi-apertured magnetic core and an associated transistor network. The gate circuit of the invention utilizes the cores described in the copending application Serial No. 109,440, so that noise cancellation may be achieved. This noise cancellation, as mentioned above, permits available and relatively economical materials to be utilized without affecting the stability, reliability or product uniformity of the units.

While particular embodiments of the invention have been shown and described, modifications may be made, and it is intended in the claims to cover such modifications which fall within the scope of the invention.

What is claimed is:
1. A magnetic core circuit including in combination,
   a magnetic core having high flux retentivity properties providing set and cleared stable remanent magnetic states and with a plurality of flux paths each capable of being switched to either magnetic state, and formed to have a major aperture with a major flux path therearound, an input minor aperture having an input flux path thereabout which is in interacting relation to said major path, and first and second output minor apertures spaced along said major path and each forming independent output flux paths,
   set winding means magnetically coupled to said input flux path for selectively switching magnetic flux therein to a set stable magnetic state,
   block winding means magnetically coupled to said major flux path for selectively switching magnetic flux around the major aperture and said input aperture to a cleared stable remanent magnetic state,
   prime winding means magnetically coupled to said output flux paths and to said major flux path for selectively magnetically exciting said core such that when said input flux path is in said set magnetic state the flux around said first output aperture is switched to a set magnetic state, readout means magnetically coupled to said output apertures for sensing the last mentioned set magnetic state and operative when sensing such state to switch the flux around said output apertures to a cleared stable magnetic state, and the core portions adjacent said second output aperture providing noise cancellation within said core.

2. A gate circuit including in combination: a core of magnetic material which has relatively high flux retentivity properties, said core having first and second sections respectively forming first and second major closed loop flux paths, each of said sections having a major aperture therein and each having a minor input aperture and a minor output aperture; a first winding mounted on said core and extending through the major apertures in said first and second sections for establishing a magnetic flux of a first particular configuration in said first section; an output winding mounted on said core and extending through the output apertures in said first and second sections; electric circuitry coupled to said output winding and adapted to produce an output signal when the direction of the flux extending around the output aperture of said first section is switched from a first to a second direction; further winding means mounted on said core and extending through the output apertures of said first and second sections for switching said flux around the output aperture of said first section from said first to said second particular direction only when the flux in said core is established in a particular configuration different from said first configuration; a still further winding mounted on said core and extending through the output apertures of said first and second sections for switching the flux around the output aperture of said first section from said second to said first direction; and control winding means mounted on said core for establishing the flux in said core in said particular configuration in response to a signal applied thereto.

3. A gate circuit including in combination: a core of magnetic material which has relatively high flux retentivity properties, said core having first and second sections respectively forming first and second major closed-loop flux paths, each of said sections having a major aperture and each having a minor input aperture and a minor output aperture; a first winding mounted on said core and extending through the major apertures in said first and second sections for establishing a magnetic flux of a first configuration in said first major closed loop path; an output winding mounted on said core and extending through the output apertures in said first and second sections; electric circuitry coupled to said output winding and adapted to produce an output signal when the direction of the flux extending around the output aperture of said first section is switched from a first to a second particular direction; a further winding mounted on said core and extending through the output apertures of said first and second sections for switching the flux extending around the output aperture of said first section from said second to said first direction only when the flux in said first major closed loop path is set in particular configuration different from said first configuration; a still further winding mounted on said core and extending through the output apertures in said first and second sections for switching the flux extending around the output aperture of said first section from said first to said second direction; and a set winding extending through said input aperture of said first section of said core and responsive to a signal applied thereto for setting the flux in said first major flux path to said particular configuration.

4. A gate circuit including in combination: a core formed of magnetic material which has relatively high flux retentivity properties, said core having first and second sections respectively forming first and second major closed loop flux paths, each of said sections having a major aperture and each having a minor input aperture and a minor output aperture; a block winding mounted on said core and extending through the major apertures in said first and second sections for establishing a magnetic flux of a first configuration in said first section; an output winding mounted on said core and extending through the output apertures in said first and second sections; electric circuitry including a transistor coupled to said output windings and adapted to produce an output signal when the direction of the flux extending around the output aperture of said first section is switched from a first to a second direction; a prime winding mounted on said core and extending through the output apertures of said first and second sections for switching the flux around the output aperture of said first section from said second to said first direction only when the flux in said first major flux path is set to extend in a particular configuration different from said first configuration; a read winding mounted on said core and extending through the output apertures of said first and second sections for switching the flux extending around the output aperture of said first section from said first to said second direction; and a set winding mounted on said core and extending through the input aperture of said first section and responsive to a signal applied thereto for setting the flux in said first major magnetic path in said particular configuration.

5. A gate circuit including in combination: a core of magnetic material which has relatively high flux retentivity properties, said core having first and second sections respectively forming first and second major closed-loop flux paths, each of said sections having a major aperture, and each having a minor input aperture and a minor output aperture; a block winding mounted on said core and extending through the major apertures in said first and second sections for establishing a magnetic flux of a first configuration in said first major closed-loop flux path; an output winding mounted on said core and extending through the output apertures in said first and second sections; electric circuitry coupled to said output winding and adapted to produce an output signal when the direction of the flux extending around the output aperture of said first section is switched from a first to a second particular direction; a prime winding mounted on said core and extending through the output apertures in said first and second sections for switching the flux extending around said output aperture of said first section from said first to said second direction only when the flux in said first major flux path is set in a particular configuration different from said first configuration; a reset winding mounted on said core and extending through the output apertures of said first and second sections for switching the flux extending around the output aperture of said first section from said second to said first direction; and a set winding mounted on said core and extending through the input aperture of said first section and responsive to a signal applied thereto for setting the flux in said core in said particular configuration.

References Cited by the Examiner

UNITED STATES PATENTS

| 2,983,906 | 5/1961 | Crane | 340—174 |
| 3,007,140 | 10/1961 | Minnick et al. | 340—174 |
| 3,048,828 | 8/1962 | Cataldo | 340—174 |
| 3,125,747 | 3/1964 | Bennion | 340—174 |

BERNARD KONICK, *Primary Examiner.*

S. M. URYNOWICZ, *Assistant Examiner.*